United States Patent
Morara

(10) Patent No.: US 7,409,325 B2
(45) Date of Patent: Aug. 5, 2008

(54) OBJECT ORIENTED LIBRARY FOR MARKOV CHAIN MONTE CARLO SIMULATION

(75) Inventor: Michele Morara, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 326 days.

(21) Appl. No.: 11/190,595

(22) Filed: Jul. 27, 2005

(65) Prior Publication Data

US 2006/0023723 A1 Feb. 2, 2006

Related U.S. Application Data

(60) Provisional application No. 60/591,459, filed on Jul. 27, 2004.

(51) Int. Cl.
G06F 17/10 (2006.01)
(52) U.S. Cl. .......................................................... 703/2
(58) Field of Classification Search .................... 703/2; 370/395.6
See application file for complete search history.

(56) References Cited

U.S. PATENT DOCUMENTS

| | | | |
|---|---|---|---|
| 5,301,118 A | 4/1994 | Heck et al. | |
| 6,061,662 A | 5/2000 | Makivic | |
| 6,112,021 A | 8/2000 | Brand | |
| 6,289,296 B1 | 9/2001 | Umeno | |
| 6,640,191 B1 | 10/2003 | Deem et al. | |
| 6,671,661 B1* | 12/2003 | Bishop | 703/2 |
| 6,883,148 B1* | 4/2005 | Teig et al. | 716/4 |
| 7,072,811 B2* | 7/2006 | Kadane et al. | 703/2 |
| 2002/0099594 A1 | 7/2002 | Heard | |
| 2004/0010399 A1 | 1/2004 | Kadane et al. | |

OTHER PUBLICATIONS

Fill, L. An Interruptible Algorithm for Perfect Sampling via Markov Chains, Proceedings of the 29th Annual ACM Symposium on Theory of Computing STOC '97, May 1997, pp. 688-695.*
Radford M. Neal, Markov chain Monte Carlo (MCMC) Package, copyright 1995-2003, pp. 1-38.
Matthias Troyer et al., The Alea library Version 1.3, a class library and application framework for automatic parallelization of Monte Carlo simulations, Jan. 1999, Zürich, Switzerland, pp. 1-28.
Alexander Schliep et al., GHMM: A LGPL-licensed Hidden Markov Model Library, pp. 1-11.
Gregory R. Warnes, HYDRA: A Java library for Markov Chain Monte Carlo, 2nd International Workshop on Distributed Statistical Computing (DSC 2001), Mar. 2001, Vienna, Austria, pp. 1-12.

(Continued)

*Primary Examiner*—Russell Frejd
(74) *Attorney, Agent, or Firm*—Stevens & Showalter LLP

(57) ABSTRACT

Systems, methods and computer implemented tools are provided for performing Markov chain Monte Carlo simulations. Computer implemented tools include a library of MCMC classes that define a core foundation of the MCMC analysis that minimizes knowledge of computer programming and manages the overhead associated with implementing MCMC simulation. Moreover, a user interacting with the various embodiments of the present invention is given numerical control over the problem at issue so that a skilled user can run successful MCMC simulations even where components of the distribution of interest are non-standard.

20 Claims, 10 Drawing Sheets

OTHER PUBLICATIONS

Gregory R. Warnes, HYDRA: A Java library for Markov Chain Monte Carlo, Technical Report No. 394, Apr. 2001, Rev. Mar. 2002, Groton, CT, pp. 1-32.

Andrew D. Martin and Kevin M. Quinn, Scythe Statistical Library: Introduction, Release 0.1., Jul. 2001, pp. 1-25.

Gregory R. Warnes, HYDRA: A Java library for Markov Chain Monte Carlo, Mar. 2002, Groton, CT, pp. 1-32.

Gregory R. Warnes, HYDRA: A Brief Overview of HYDRA, Mar. 2002, pp. 1-2.

David Spiegelhalter et al., WinBUGS User Manual, Version 1.4, Jan. 2003, pp. 1-60.

Martyn Plummer, JAGS: A Program for Analysis of Bayesian Graphical Models Using Gibbs Sampling, 3rd International Workshop on Distributed Statistical Computing (DSC 2003), Mar. 2003, Vienna, Austria, pp. 1-10.

Andrew D. Martin and Kevin M. Quinn, Markov Chain Monte Carlo (MCMC) Package, Version 0.4-6, Nov. 2003, pp. 1-50.

MCMC Reference Manual, Generated by Doxygen 1.3.9.1., Nov. 2005, pp. 1-137.

* cited by examiner

CMcmcVectorArray: Variable Class

| Properties: | Description |
|---|---|
| void SetSize(int Count, int Dimension) | Sets Size (Count) of the Array and the Dimension of Each Vector Element in the Array. |
| void SetValue(double Value) | Sets the initial Value of the Array Elements. |
| void SetName(const char *Name) | Set the Base Name of the Variable. |
| CMcmcModel* GetModel() | Get the Pointer to the Model (Container) Object (See Model Class Definition). |
| CMcmcSummary* GetStatistics(int *i*, int *j*) | Get Summary Statistics Information Associated with the J-th Element of the I-th Vector. |

FIG. 4

CMcmcVectorArray: Variable Class

| Operators: | Description |
|---|---|
| double * operator [](int i) | Returns the Pointer to Current Value of the I-th Vector of the Array. |
| operator double *() | Returns the Pointer to the Current Value of the First Component of the First Element of the Array. |

FIG. 6

CMcmcVectorArray: Variable Class

| Methods: | Description |
|---|---|
| void Jump(int Index, double*NewValue) | The MCMC Proposal Density. |
| double Acceptance(int Index, const double * NewValue) | The MCMC Acceptance Probability. |
| void Enable(int Flags) | Enables Diagnostic and Tracking Flags. |
| void Disable(int Flags) | Disables Diagnostic and Tracking Flags. |
| void Callback() | Customized Run-Time Callback Function To Monitor the Simulation. |

FIG. 5

CMcmcVectorArray: Variable Class

| Events: | Description |
|---|---|
| void OnBegin(int RunID) | An Initialization Routine Invoked Any Time a Simulation Begins. RunID is a Run Identification Number Passed by the Begin Method in the Model Class (See Below). |
| void OnEnd() | A Termination Routine Invoked Any Time a Simulation Ends. |
| void OnAccept(int Index, const double *New Value) | A Routine Invoked by the Framework Every Time A Proposed Value is Accepted. |

FIG. 7

CMcmcModel: Model Class

| Properties: | Description |
|---|---|
| void SetPath(const char *Path, int OpenFlags) | Sets the Simulation Path Where the Results are to be Stored. OpenFlags Set if Creating a New Simulation or Opening an Existing One. |
| void PrintEvery(int Steps) | Sets How Often the Diagnostics Should be Printed. |
| void SaveEvery(int Steps) | Sets How Often the Chain, The Statistics, and the MCMC Status Should be Saved. |
| void CallbackEvery(int Steps) | Sets How Often the Callback Functions Should be Called by the Framework. |
| void SetThinning(int Steps) | Sets Thinning Interval (How Often the Chain Should Be Sampled. |
| void SetBurn(int Steps) | Sets the Number of Burn-In Steps. |
| void SetLoop(int Steps) | Sets the Number of MCMC Steps. |

FIG. 9

CMcmcModel: Model Class

| Events: | Description |
|---|---|
| void OnBegin(int RunID) | An Initialization Routine Invoked Before the Variable-Specific OnInitialize Functions Any Time a Simulation Begins. RunID is a Run Identification Number Passed by the Begin Method (See MCmc Model: Model Class). |
| Void OnEnd() | A Termination Routine Invoked After the Variable-Specific OnTerminate Functions Any Time a Simulation Ends. |

FIG. 11

CMcmcModel: Model Class

| Methods: | Description |
| --- | --- |
| void Add(CMcmc-Variable & Var) | Registers the User-defined Variable Objects That Define the Model |
| void Run(int RunID=0) | Runs the Simulation. Calls Begin, Load or New, Burn, Loop, and End. Override this Method to Run Customized Simulations. |
| void Begin(int RunID) | Informs the Framework That the Simulation is to Begin. Invokes The OnInitialize Events of the Model and Variable Classes and Passes to Them a Run-Identification Number RunID. |
| void New(const char* Path) | Creates Files to Store the Results and Information of the Simulation in the Given Path Directory, Initializes the Chain and The MCMC Status Variables According to the Current Settings. |
| void Load(const char* Path) | Reads the Chain and the MCMC Last Status Information From the Path Directory and Restarts the Simulation From the Last Saved Step. |
| void Burn(int Steps) | Performs the MCMC Simulation Without Saving the Chain (The "Burn-In" Steps are not Considered a Valid Sample, Because the Chain is not Supposed to Have Reached the Ergodic Equilibrium Yet). |
| void Loop(int Steps) | Performs the MCMC Simulation and Saves the Chain According to the Settings. |
| void End() | Informs the Framework That the Simulation has Finished. Invokes the OnTerminate Events of the Model and Variable Classes. |
| void Callback() | A Function Called by the Framework During the MCMC Loop (See Description in the Variable Class Definition). |

FIG. 10

OBJECT ORIENTED LIBRARY FOR MARKOV CHAIN MONTE CARLO SIMULATION

CROSS REFERENCE TO RELATED APPLICATIONS

This application claims the benefit of U.S. Provisional Patent Application Ser. No. 60/591,459, filed Jul. 27, 2004, the disclosure of which is hereby incorporated by reference.

BACKGROUND OF THE INVENTION

The present invention relates in general to Markov chain Monte Carlo (MCMC) analysis and more specifically to systems, methods and computer implemented tools for performing MCMC simulations.

A Markov chain is a sequence of random variables with a probability of transition from a current random variable to a subsequent random variable that depends only on the value (or state) of the current random variable. To generate a realization from a Markov chain, an initial state is either specified or randomly selected, e.g., from a probability distribution over the possible states of the initial random variable. Sampling then commences by building a succession of realizations where the probability density over the possible states of the next realization depends only upon the state of the current realization. A Markov chain is said to have a limiting distribution (also called invariant or stationary distribution) if, as the number of samples in the Markov chain becomes large, the relative frequency of the realizations of the chain uniformly converges to the distribution.

In general terms, a Monte Carlo method is any method that solves a problem by generating suitable random numbers. Thus, Markov chain Monte Carlo (MCMC) simulations provide a means of creating a Markov chain with a given invariant distribution by generating suitable random numbers. Accordingly, if there is a need to sample randomly from a specific probability distribution, then an MCMC simulation may be used to generate a Markov chain that converges to that probability distribution. Once the Markov chain has (approximately) converged, the subsequent realizations from the generated Markov chain can be used as an approximation of samples drawn from the specific probability distribution of interest.

MCMC simulation is a particularly compelling tool for estimating parameters in complex models having a large number of degrees of freedom where an analytical solution is impractical. For example, in numerical analysis, MCMC simulations may be used for high dimensional integration and for finding the minimum and/or maximum of parameters in a model of interest. MCMC simulations may be used in computer science to study random algorithms, e.g., to study whether an algorithm of interest scales appropriately as the size of the underlying problem increases. In physics, MCMC simulations may be used in statistical mechanics and in analyzing complex dynamical systems. In statistics, MCMC simulations have been increasingly used for exploring posterior distributions of random parameters in hierarchical Bayesian models that are generally too complicated to be studied analytically.

SUMMARY OF THE INVENTION

In accordance with various aspects of the present invention, systems, methods and computer implemented tools are provided for performing Markov chain Monte Carlo simulations. Computer implemented tools include a library of MCMC classes that define a core foundation of the MCMC analysis that minimizes knowledge of computer programming and manages the overhead associated with implementing MCMC simulation. Moreover, a user interacting with various embodiments of the present invention is given numerical control over the problem at issue so that a skilled user can run successful MCMC simulations even where components of the distribution of interest are non-standard.

According to an embodiment of the present invention, a computer readable medium having stored thereon, a library of classes for performing Markov chain Monte Carlo simulations comprises a variable class and a model class. The variable class supports derived user-defined variable classes assignable to each variable of a target distribution to be sampled from. Additionally, the variable class comprises a jump function to be overridden with a user-defined proposal density function in a corresponding user-defined variable class and an acceptance function to be overridden with a user-defined acceptance probability function in the corresponding user-defined variable class. The model class defines a container for instances of the user-defined variable classes and includes at least one sampler function implementing a Markov chain Monte Carlo simulation by calling the user-defined proposal density and user-defined acceptance probability functions for the instances of user-defined variable classes contained in the model class.

According to an aspect of the present invention, a user may identify further levels of generality by building layers of intermediate classes. These intermediate classes may be classes that describe an entire distribution or only a component of the distribution. The nature of the library further allows a user to create a series of objects with increasing levels of specialization. In this way, the user can populate a library with semi-generic objects created during previous works, using those objects as starting points for new simulations.

According to another embodiment of the present invention, a method of performing a Markov chain Monte Carlo simulation on a computer using a library of classes comprises identifying a distribution to sample from and creating a user-defined variable class deriving it from a variable class of the library of classes for each variable of the distribution by defining a proposal density according to the distribution to sample from, encoding into the user-defined variable class, a user-defined jump function implementing the proposal density, defining an acceptance probability according to the distribution to sample from and encoding into the user-defined variable class, a user-defined acceptance function implementing the acceptance probability. The method further comprises instantiating each of the user-defined variable class, registering each instance of the user-defined variable classes in a model class and instantiating the model class and running the simulation by executing a sampler function which calls the user-defined jump function and user-defined acceptance function for each instance of user-defined variable class registered in the instance of the model class.

According to another embodiment of the present invention, a system for performing Markov chain Monte Carlo Simulation using a library of classes on a computer comprises a processor, a memory device and a program code resident in the memory device. The program code is executable by the processor to run the Markov chain Monte Carlo simulation by creating a user-defined variable class deriving it from a variable class of the library of classes for each variable of the distribution including encoding into the user-defined variable class, a user-defined jump function implementing a proposal density and encoding into the user-defined variable class, a user-defined acceptance function implementing an acceptance probability. Further, the program code is executable by the processor to run the simulation by instantiating each of the user-defined variable class, registering each instance of the user-defined variable classes in a model class, instantiating the model class and running the simulation by executing a sampler function which calls the user-defined jump function and user-defined acceptance function for each instance of the user-defined variable class registered in the instance of the model class.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals, and in which:

FIG. 4 is a class definition table illustrating exemplary properties of a CMcmcVectorArray variable class;

FIG. 5 is a class definition table illustrating exemplary method functions for the CMcmcVectorArray variable of FIG. 4;

FIG. 6 is a class definition table illustrating exemplary overloaded operators of the CMcmcVectorArray variable class of FIG. 4;

FIG. 7 is a class definition table illustrating exemplary event functions for the CMcmcVectorArray variable of FIG. 4;

FIG. 9 is a class definition table illustrating exemplary properties of a CMcmcModel class;

FIG. 10 is a class definition table illustrating exemplary method functions for the Model of FIG. 9;

FIG. 11 is a class definition table illustrating exemplary event functions for the Model of FIG. 9;

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

One characteristic of a Markov chain is the transition kernel, which defines a conditional probability that a chain will transition to a particular new state given a current state. MCMC simulations define the transition kernel by specifying an appropriate proposal mechanism (herein also referred as jump), which proposes a possible state for the next realization of the chain, together with an acceptance probability (herein also referred as acceptance), which defines the conditional probability of accepting the proposed state as the next realization of the chain given the current state. Together, the jump and acceptance specify the transition probabilities and are referred to herein as the sampling equations for the simulation. For example, often times, a distribution of interest is known, e.g., the posterior distribution of the parameters in a Bayesian statistical model. Thus, the key to constructing a useful MCMC simulation is to find a transition kernel such that the relative frequency with which the realizations of the chain are in each state converges to that chain's invariant density.

Mathematical Principle of the Metropolis-Hasting and Gibbs Algorithms

One aspect of the present invention comprises an MCMC library that may be applied to solve a broad class of problems that can be characterized by a function that is integrable over a given domain. Given such a function, it is possible to generate a sequence of values where each step depends only on the previous step (a Markov chain), whose limiting distribution is the normalized function.

In mathematical terms, given a function $f: \Omega \subseteq R^n \to R$ such that $\int_\Omega f(x)dx < \infty$ (i.e., a function that is integrable over a given domain $\Omega$), it is possible to generate a Markov chain, denoted $\{x_j \in \Omega\}_{j \in N}$, which is a sequence of realizations where each realization depends only on the previous realization. Moreover, the invariant (or stationary) distribution of the Markov chain is the normalized function $\hat{f}$, i.e., $f/\|f\|_{\Omega,1}$. That is, the relative frequency that the Markov chain is in any given state converges to that state's invariant density.

Figure 1:
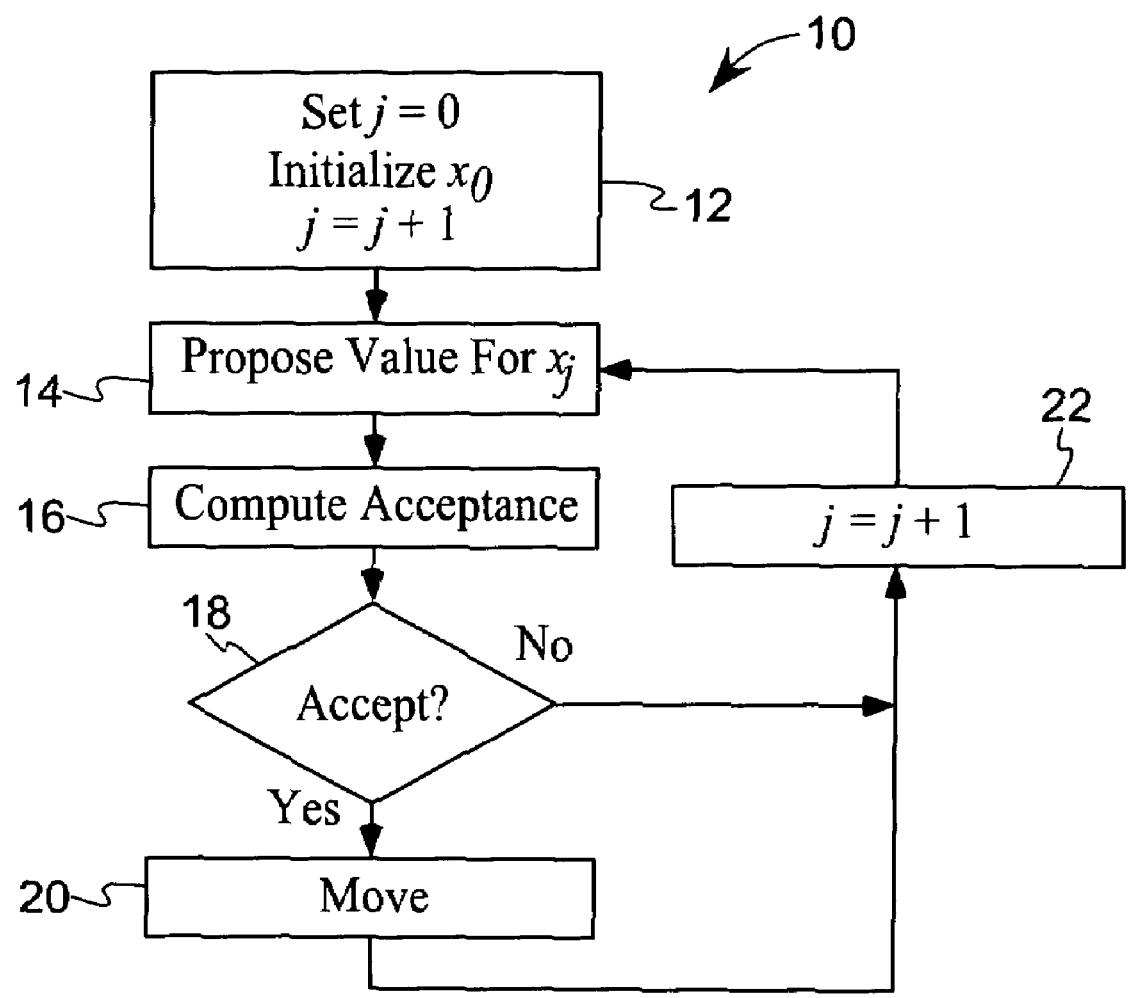
FIG. 1 is a flow chart illustrating an implementation of the Metropolis-Hastings algorithm.

Referring to FIG. 1, a flow chart illustrates a method 10 for implementing a Metropolis-Hastings sampler. The Metropolis-Hastings sampler defines one representative sampler that may be implemented by the various aspects of the present invention and is briefly presented for contextual purposes. Initially, the starting state of a Markov chain intended to simulate realizations from an invariant distribution for a variable of interest, X, is initialized at 12, such as by selecting an arbitrary value, $x_0$, from an initial distribution.

Let j represent an index to a series of discrete events. For a given event, suppose that the value of $x_{j-1}$ has already been determined. A new value for the variable $x_j$ is proposed at 14, which may be based upon the value of $x_{j-1}$ and a predetermined proposal density distribution. The proposal distribution (or proposal density) at 14 is also referred to herein as the jump. A new value for $x_j$ is proposed via a proposal density, which is written in general form as:

$$x'_j \sim J(X'|x_{j-1})$$

where $x'_j$ is the proposal value for $x_j$, and the $\sim$ operator is used to indicate that the variable on the left side of the expression is drawn from a distribution governed by the density function on the right side of the expression.

A corresponding acceptance probability is computed at 16, and a decision is made whether to accept the sample into the chain at 18. In mathematical terms, the value proposed for $x_j$ via the proposal density at 14 is accepted at 18 with a probability computed at 16 as:

$$A(x'_j, x_{j-1}) = \min\left[1, \frac{f(x'_j)/J(x'_j \mid x_{j-1})}{f(x_{j-1})/J(x_{j-1} \mid x'_j)}\right]$$

If accepted at 18, the proposal value $x'_j$ is recorded in the chain, i.e., $x_j = x'_j$. If, on the other hand, the proposal value $x'_j$ is rejected, the value of the variable at increment j is the same as the value of the variable at increment $x_{j-1}$, i.e., $x_j = x_{j-1}$. Thus, if the proposal variable $x'_j$ is accepted, the "chain" advances or moves at 20, otherwise, the chain does not. The method 10 then increments the index j at 22 and the process flow loops back to propose a new value for the variable x at 14. The above process continues until the chain reaches its equilibrium, i.e., the probability of realizations of the chain being in a given state converges approximately to the invariant density of the state. The proposal density together with the acceptance probability thus defines a transition kernel that establishes a probability that the chain will move to a particular new state given the current state.

Figure 2:
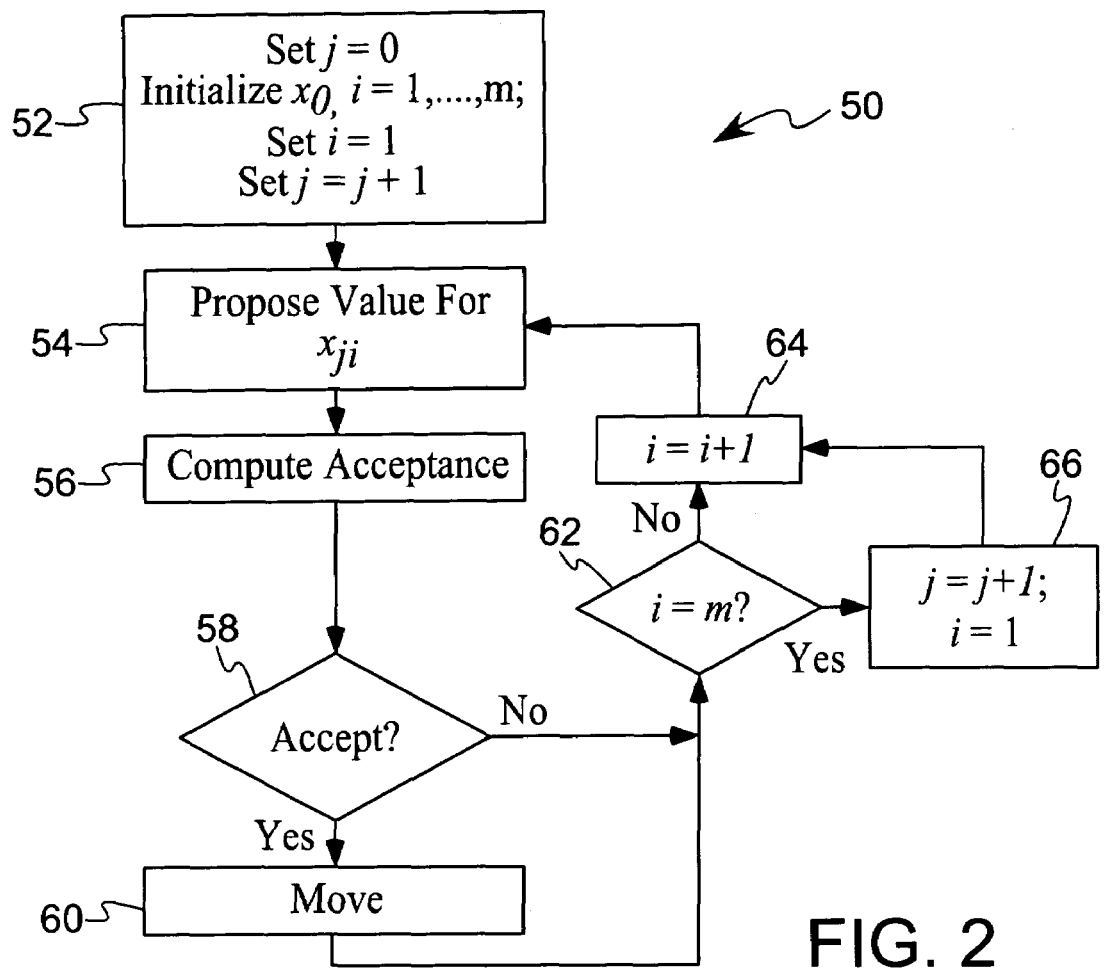
FIG. 2 is a flow chart illustrating an implementation of the component-wise Metropolis-Hastings algorithm.

The method 10 may be expanded upon for more complex variables of the target distribution. For example, in practical applications, the variable $x_j$ may be a vector. FIG. 2 illustrates a method 50 of implementing a component-wise Metropolis-Hastings sampler where a variable of interest comprises a vector and where each component of the vector is considered in turn. Assume that a variable of interest $x_j$ comprises a vector at a chain step index j having m components, where m is an integer value greater than zero. In mathematical terms:

$$x_j \equiv (x_{j1}, \ldots, x_{jm})$$

where each vector component $x_{ji}$ ($1 \leq i \leq m$) can be a scalar or a vector. The vector $x_j$ and the chain step index j are initialized at 52, such as by setting the index j=0 and by selecting arbitrary values for the various components, $x_0$ ($x_{0,1}, \ldots, x_{0,m}$). After initializing the vector $x_j$, the index j is incremented and the index i is reset, e.g., to the value of 1 as illustrated. The component(s) of the vector $x_j$ are considered by proposing a new value for each component $x_{ji}$, i.e., performing a jump, based upon a predetermined proposal density at 54. In mathematical terms, a new value for the component $x_{ji}$ is proposed via the proposal density:

$$x'_{ji} \sim J_i(X'_i \mid x_{j1}, \ldots, x_{j,i-1}, x_{j-1,i+1}, \ldots, x_{j-1,m})$$

A corresponding acceptance probability for the proposal value $x'_{ji}$ is computed at 56. In mathematical terms, the proposal value $x'_{ji}$ is accepted with probability:

$$A_i(x'_{ji}, x_{j-1,i}) = \min\left[1, \frac{f(x_{j1}, \ldots, x_{j,i-1}, x'_{ji}, x_{j-1,i+1}, \ldots, x_{j-1,m})/J_i(x'_{ji} \mid x_{j1}, \ldots, x_{j,i-1}, x_{j-1,i}, \ldots, x_{j-1,m})}{f(x_{j1}, \ldots, x_{j,i-1}, x_{j-1,i}, \ldots, x_{j-1,m})/J_i(x_{j-1,i} \mid x_{j1}, \ldots, x_{j,i-1}, x'_{ji}, x_{j-1,i+1} \ldots, x_{j-1,m})}\right]$$

A decision is made at 58 whether to accept the proposal value $x'_{ji}$ into the chain. The new value $x'_{ji}$ is recorded in the chain if accepted at 58. That is, $x_{ji} = x'_{ji}$ if the proposal value is accepted into the chain. If, on the other hand, the new proposal value $x'_{ji}$ is rejected, the corresponding value of the component $x_{ji}$ of vector $x_j$ is the same as the value of the component of the vector $x_{j-1}$, i.e., $x_{ji} = x_{j-1,i}$. Thus, if the component $x_{ji}$ of the vector $x_j$ is accepted, the "chain" for that component advances (moves) at 60, otherwise, the chain does not move.

A check is made at 62 to determine whether every component of the vector $x_j$ has been considered for the current chain step index j. That is, if the index i is less than the number (m) of components in the vector, then processing continues for the next component of the vector at the current chain step index j. The index i is updated at 64 and the process flow then loops back to propose a new value for the next component $x_{ji}$ of the vector $x_j$ at 54. If every component of the vector $x_j$ has already been considered for the current chain step index j, i.e., the index i=m, then the index j is updated and the index i is reset at 66. The process flow then loops back to propose a new value for the next component $x_{ji}$ of the vector $x_j$ at 54. The above-described loop continues until equilibrium has been approximately reached. Optionally, the particular order in which the components of the vector $x_j$ are updated can be randomized to further remove potential correlations.

The component-wise version of the Metropolis-Hasting algorithm allows a special case, referred to as Gibbs sampling or a Gibbs sampler, where a sample can be drawn from the full conditional probability for a given component $\bar{i}$ of the vector $x_j$, i.e., $$x'_{j\bar{i}} \sim J_{\bar{i}}(X_{\bar{i}} \mid x_{j1}, \ldots, x_{j,\bar{i}-1}, x_{j-1,\bar{i}+1}, \ldots, x_{j-1,m}) \equiv \frac{f_{\bar{i}}(x_{j1}, \ldots, x_{j,\bar{i}-1}, X_{\bar{i}}, x_{j-1,\bar{i}+1}, \ldots, x_{j-1,m})}{\int f_{\bar{i}}(x_{j1}, \ldots, x_{j,\bar{i}-1}, X_{\bar{i}}, x_{j-1,\bar{i}+1}, \ldots, x_{j-1,m}) dX_{\bar{i}}}$$

If the proposal density is set equal to the full conditional probability for a given component $\bar{i}$ of the vector $x_j$, the acceptance $A_{\bar{i}}(x'_{j\bar{i}}, x_{j-1,\bar{i}})$ becomes one, and Gibbs sampling is performed on that component. *Gibbs sampling is often numerically preferred over Metropolis-Hasting because the chain moves without rejection, and convergence (to the ergodic limit) is usually better achieved.*

The MCMC Library

According to an aspect of the present invention, a library of classes, referred to herein as the MCMC library, is provided for the implementation of MCMC simulation, which includes MCMC distribution sampling. The library of classes will be described herein as a C++ object-oriented library of classes. However, the invention is not limited in this regard. Rather, the concepts of the present invention are broadly applicable and can be implemented, for example, using any computer programming environment that implements and/or emulates for example, objects, object inheritance, and object reference.

According to various aspects of the present invention, the MCMC library allows different levels of complexity in its usage by providing a developmental framework that implements the general structures and features required to perform MCMC simulation, leaving the user to implement the desired sampling equations for a specific distribution of interest. The MCMC library thus reduces the amount of computer code writing required to implement a desired simulation. The MCMC library further provides MCMC classes that force the user into a logical organization of the problem at hand as will be seen in detail below.

Figure 3:
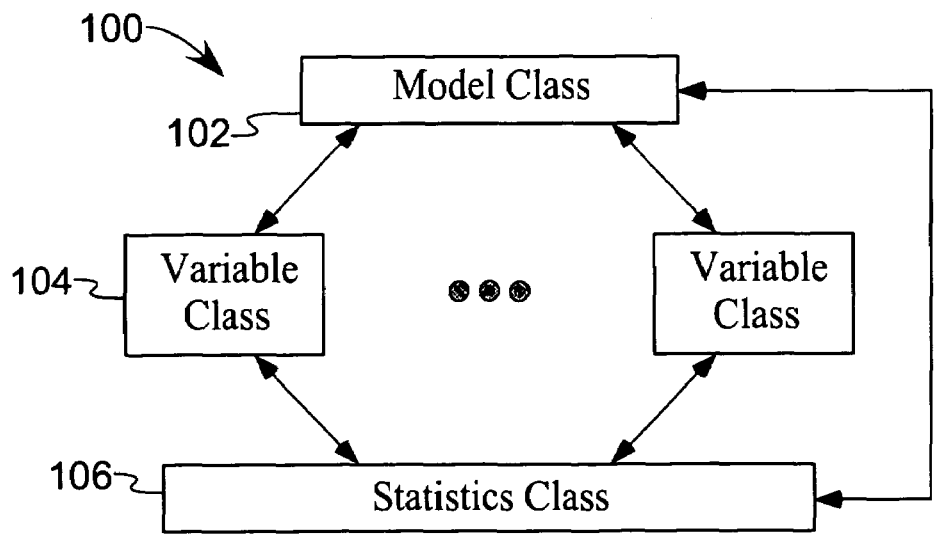
FIG. 3 is a chart illustrating reference-relationships derived from an MCMC library of classes according to an embodiment of the present invention.

Referring to FIG. 3, according to a first aspect of the present invention, an MCMC simulation 100 is constructed from an MCMC library of classes. The MCMC simulation 100 comprises a model class 102, one or more variable classes 104 and a statistics class 106. The model class 102 comprises functions for running the simulation, serves as the main container for the variable classes 104 associated with the MCMC simulation, and serves as the main container for the statistics class 106. Each variable object 104 of the MCMC simulation is associated with a corresponding variable of the underlying distribution and defines the sampling equations, e.g., a proposal density and corresponding acceptance probability with respect to the distribution to be sampled. The statistics class 106 defines the "memory" of the model class 102 and each of the variable classes 104. According to settings in the corresponding variable class 104, the statistics class 106 records the chain and/or the descriptive statistics of each component of the distribution.

One exemplary implementation of the MCMC library class is discussed below with reference to FIGS. 4-11. In the tables shown FIGS. 4-7 and 9-11, properties and functionalities discussed are for illustrative purposes. In practice, alternative and/or additional properties and features may be provided. Moreover, the functions discussed below represent properties, operators, methods and events that a user will access for a standard use of the MCMC library. Private and protected functions used by an associated framework to perform the specific tasks of the MCMC simulation are not listed herein as such functions will be framework specific.

CMcmcVariable Class

Each variable object 104, which is referred to herein generally for purposes of discussion as a CMcmcVariable class, may be implemented based upon a generic variable class. A CMcmcVariable class is provided for each variable in the target distribution.

CMcmcVectorArray: CMcmcVariable Class

The most general type of CMcmcVariable class provided in the exemplary classes herein defines an array of vectors and is thus robust enough to comprehend scalar as well as vector variables. As such, this single variable class can be used for a broad range of MCMC variables. During execution of the MCMC simulation, each vector in the array is updated sequentially, and as each vector in the array is updated, the corresponding components of that vector are updated at once.

Referring to FIG. 4, a table of properties from an exemplary class definition for the CMcmcVectorArray variable class is provided. As shown, the properties define the general features of the CMcmcVectorArray variable class and include SetSize, SetValue, SetName, GetModel, and GetStatistics functions.

The SetSize function defines the size of the variable array and the dimensions of each vector in the array. Correspondingly, the SetValue function establishes the initial values for the components of each vector in the array. Polymorphic versions of the SetValue function may be provided to set initial values of array elements all at once, in blocks, or individually. The SetName function assigns names to each element of the corresponding array that may be used in the output of the simulation 100. For example, given a base name, the library generates a default name for each element of the array.

The GetModel function obtains the pointer to the corresponding model class 102, i.e., the container class, as will be explained in greater detail herein. Similarly, the GetStatistics function obtains the pointer to a summary statistics class contained in the statistics class 106, corresponding to a given component of a given vector of the CMcmcVectorArray variable, e.g., the summary statistics information associated with the J-th element of the I-th vector.

Referring to FIG. 5, several exemplary methods are illustrated for the class definition for the CMcmcVectorArray variable class including a Jump method, an Acceptance method, an Enable method, a Disable method and a Callback method. The Jump function is provided for defining and implementing a proposal density for a desired sampling equation. Similarly, the Acceptance function is provided for defining and implementing the acceptance probability of the sampling equation for the corresponding MCMC simulation. These methods must be overridden by the user in the user-defined variable classes to implement the desired sampling equations.

With brief reference to FIG. 6, it may be desirable to make the external behavior of a variable class equivalent to a numeric variable, e.g., to improve the readability of the code that the user writes to implement the appropriate proposal mechanisms and acceptances probabilities, e.g., the Jump and Acceptance functions, when implementing the sampling equations of the desired MCMC simulation. As illustrated, operators, such as element extraction and type cast, for each variable class 104 may be overloaded. For example, if x is a variable class of type CMcmcVectorArray, x[i] may be set up to return the pointer to the $i^{th}$ vector of the array. Similarly, x[i][j] may be set up to return the $j^{th}$ element of the $i^{th}$ vector of the array.

With reference back to FIG. 5, as noted above, to execute a Metropolis-Hastings sampler, a proposal candidate should be derived via the proposal density, which is realized by the Jump method, and then tested against an acceptance probability, which is realized by the Acceptance method, for each variable (or component) in the model being simulated. The form of the proposal density is arbitrary, and the arbitrary nature of the proposal density is addressed by the acceptance function, via the acceptance probability, which is used to correct for unlikely steps in the chain.

Unless the full conditional probability can be computed (in which case Gibbs sampling can be performed), the choice of the proposal density is often left to experimentation to find a suitable function. This observation is particularly evident when the target distribution is multimodal, dispersed or not connected. As such, the variable classes 104, e.g., the CMcmcVariable classes, of the present invention allow the user to have full control over the proposal density and corresponding acceptance probability by requiring the user to override the Jump method with a user-defined proposal density and the Acceptance method with a corresponding acceptance probability, for each variable class 104. By providing the user access to the jump and acceptance methods, the user has total control over the sampling equations that characterize the target distribution. Thus the user may, for example, tweak the variables of interest or tweak the proposal density and corresponding acceptance probability for select variable classes 104 via its corresponding jump and acceptance methods and repeatedly run the MCMC simulation to improve convergence, modify results and test hypothesis.

The remainder methods in FIG. 5 are not related to implementing the sampling equations, but are used to configure the diagnostic and the tracking of the statistics. Enable and Disable methods are provided for setting up (the Enable method) or disabling (the Disable method) diagnostics and tracking flags. As with the SetValue function, polymorphic versions of Enable and Disable functions may be provided to set the flags all at once, in blocks, or individually.

The Callback method is a function that may be called by the framework during the execution of a simulation depending on the tracking settings. The user can override the Callback method to implement a predetermined function, e.g., a customized run-time monitoring of the status of the simulation. During the callback process the user may also set a special flag to interrupt the simulation.

Referring to FIG. 7, the CMcmcVectorArray variable class may also provide several event functions that may be useful for performing MCMC simulation. The events may be called by the framework to alert the user when there is a change of state in the simulation. As shown, OnBegin, OnEnd and OnAccept events are provided.

The OnBegin event is an initialization routine that may be invoked each time a simulation begins. This function may be overridden by the user if multiple time initializations are desired for each run of the model, e.g., where multiple simulations are to be run, each using the same model but a different dataset. Each simulation may be characterized by a Run ID number or other suitable status information provided by the corresponding model class 102 to distinguish the various versions of the simulation. It may also be desirable to establish different settings and initializations depending on the data currently considered. The OnEnd event may be invoked any time that the simulation ends. The user may override this function if special termination code is required at the end of each run in an analogous manner to that described for the OnBegin event.

The OnAccept event may be used to trigger an action, e.g., every time a proposal value is accepted when processing a given variable class 104. For example, there may be constraints in the model being simulated that must be updated every time the chain takes a new step. In this case, those constraints may be suitably enforced by overriding this function.

As can be seen, a single variable class is capable of handling virtually every variable type that may be of interest in performing MCMC simulation. However, each component in the sampling equation that characterizes the specific distribution can be a scalar or a vector. As such, it may be desirable to provide alternative types of variable classes. For example, three additional types of variable classes 104 may be implemented to define specialized versions of the broad CMcmcVectorArray class. While not necessary to construct an MCMC simulation, the specialized variable classes may be implemented in order to optimize the performance and the readability of the code created using the MCMC library. The specialized variable classes further may be implemented to optimize execution speed by avoiding looping when the number of iterations is one.

CMcmcScalarArray: CMcmcVariable Class

A CMcmcScalarArray is a specialized version of the CMcmcVectorArray and includes all of the properties, operators, methods and events as discussed above. However, the CMcmcScalarArray defines an array whose components all have a dimension that is equal to one. That is, each component of the array is itself a scalar value. As such, the CMcmcScalarArray is equivalent to CMcmcVectorArray with the function SetSize defined as SetSize(Count, 1).

CMcmcVectorComponent: CMcmcVariable Class

A CMcmcVectorComponent is a specialized version of the CMcmcVectorArray and includes all of the properties, operators, methods and events as discussed above. However, the CMcmcVectorComponent defines a single element-array, and the only element is a vector. As such, the CMcmcVectorComponent is equivalent to the CMcmcVectorArray with the function SetSize defined as SetSize(1, Dimension).

CMcmcScalarComponent: CMcmcVariable Class

The CMcmcScalarComponent is a specialized version of the CMcmcVectorArray and includes all of the properties, operators, methods and events as discussed above. However, the CMcmcScalarComponent defines a single element-array, and the only element is a scalar. As such, the CMcmcScalarComponent is equivalent to the CMcmcVectorArray with the function SetSize defined as SetSize(1, 1).

The above structure is open-ended and allows for multiple levels of generalities in a given simulation. That is, if a user identifies a further level of generality of the desired simulation, layers of intermediate classes can easily be built within a suitable development environment. These intermediate classes may be classes that describe an entire distribution or only a component of the distribution. The object-oriented nature of the library of the present invention further allows a user to create a series of classes with increasing levels of specialization. In this way, the user can populate a user-defined library with semi-generic classes created during previous works, using those classes as starting points for new simulations.

Figure 8A:
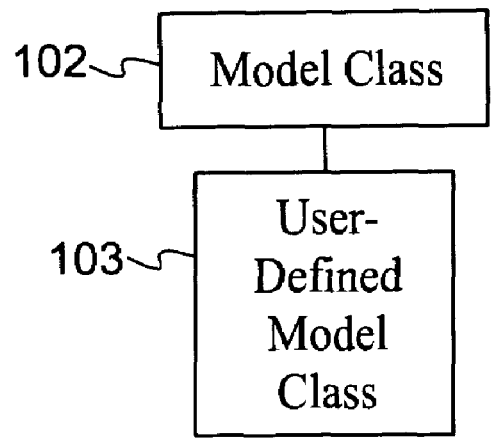
FIG. 8A is a chart illustrating the hierarchical relationship of the MCMC model classes, including user-defined classes, according to an embodiment of the present invention.
Figure 8B:
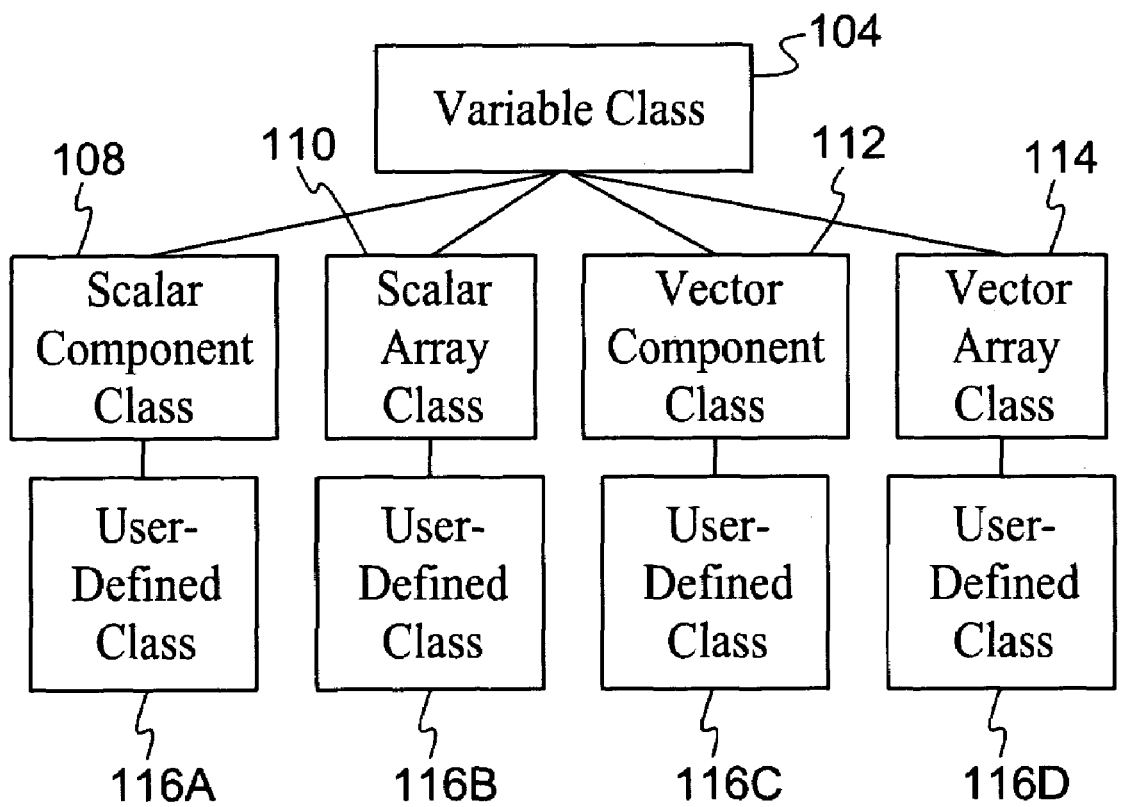
FIG. 8B is a chart illustrating the hierarchical relationships of the MCMC variable classes, including user-defined classes, according to an embodiment of the present invention.

Referring to FIG. 8A, an exemplary model class 102 may define the base class for a user-defined model class 103. Correspondingly, as illustrated in FIG. 8B, the general variable class 104 defines the base class for several different types of specific variables including by way of example, a scalar component 108, e.g., the CMcmcScalarComponent, a scalar array 110, e.g., the CMcmcScalarArray, a vector component 112, e.g., the CMcmcVectorComponent, and a vector array 114, e.g., the CMcmcVectorArray. Each variable class 108, 110, 112, 114 may define the base class for one or more additional layers of user-defined classes 116A, 116B, 116C and 116D respectively. Here, the A, B, C and D designations indicate that each user-defined class 116 can have different parameters.

CMcmcStatistics Class

The statistics class 106, which is referred to in the MCMC Library for purposes of discussion as a CMcmcStatistics class, is provided to collect and/or report the statistics of the simulation and to optimize the memory access and allocation of the simulation. That is, the variable classes 104 of the present invention do not necessarily provide mathematical support. Instead, the statistics class 106 manages computer memory required to perform the simulation and stores information corresponding to the MCMC simulation. The statistics class 106 may be used to record the chain and/or the descriptive statistics of the components of the distribution, and the specific tracking and diagnostic flags according to the setting of each of the variable classes 104. Further, public properties and methods of the statistics class 106 may be used to retrieve statistical information about each component of the distribution, e.g., max, min, mean, average, etc., and will be discussed in further detail herein.

For example, the statistics class 106 records the chain constructed during a simulation, and evaluates and stores statistics for each component in the corresponding target distribution. At the end of the simulation, the statistics class 106 saves its associated recorded information, e.g. to files. Moreover, the user can resume a previously saved simulation from the last step of the chain. The MCMC information, including the chain history, statistics and other information stored by the statistics class 106 and/or the framework may also be exported, for example, into databases, spreadsheets, or any other third-party software for data analysis.

CMcmcModel Class

The model class 102 provides the "container" for all of the variable classes 104 associated with the model and the statistics class 106, and further provides the framework for performing the MCMC simulation. The model class 102 of the MCMC Library is referred to herein for purposes of discussion as a CMcmcModel class. Once the variable classes 104 have been instantiated and registered in the model class 102, the CMcmcModel class creates files necessary for storing the results of the simulation or loads the files that store the results of a previous run of the simulation if such files have previously been created, and coordinates with the CMcmcStatistics class to store the history and the descriptive statistics of the chain during execution of the MCMC simulation.

The CMcmcModel class may further call the initialization and termination routines of each associated user-defined variable, e.g., raising the OnBegin and OnEnd events of the user-defined variable classes 116, and the OnBegin and OnEnd events of user-defined model classes 103 at the beginning and at the end of the simulation by executing the Begin and End methods of the CMcmcModel class as illustrated in FIG. 11 and discussed in greater detail below. The CMcmcModel class also calls the Jump and Acceptance methods of the associated user-defined variable classes 116 when executing the corresponding simulation, e.g., during a burn-in and an MCMC loop to build the chain. Furthermore the CMcmcModel class coordinates diagnostics and monitoring of the simulations.

The model class 102 includes properties that determine how often diagnostics are to be printed, and how often the chain, statistics and MCMC status is to be saved. Moreover, methods are provided to register the user defined variables, reinitialize the chain based upon the last saved information, perform MCMC simulation without saving the chain ("burn-in"), and perform the MCMC loop simulation that saves the chain according to the defined settings.

As illustrated in FIG. 9 the model class 102 may include properties directed towards the efficient organization and setup of the simulation 100. For example, the model class 102 may include functions such as a SetPath function, a PrintEvery function, a SaveEvery function, a CallbackEvery function, a SetThinning function, a SetBurn function, a SetLoop function, a SetBurn function and a SetLoop function.

The SetPath function sets the path where the results of the simulation are to be stored. Flags may be passed or set in this function, e.g., to create a new simulation or open an existing simulation. The PrintEvery function sets how often the diagnostics should be printed when the user is testing the sampling equations. The SaveEvery function sets how often the chain, the statistics, and the MCMC status should be saved. The CallbackEvery function sets how often the Callback functions (in either the model class 102 or in the variable classes 104) should be called. Similarly, the SetThinning function sets how often the chain should be sampled (thinning interval). The SetBurn function sets the number of burn-in steps, and similarly, the SetLoop function sets the number of MCMC steps.

Referring to FIG. 10, the model class 102 further includes several functions directed towards setting up and running the simulation, and saving the results of the corresponding simulation. For example, as seen in FIG. 10, the model class 102 comprises method functions including an Add method, Run method, Begin method, New method, Load method, End method, and Callback method for setting up, terminating, and monitoring the simulation. The model class further provides a Burn method and a Loop method for executing the simulation. Referring briefly to FIG. 11, the model class 102 may further comprise events, such as OnBegin and OnEnd, called when the simulation begins and ends.

The Add function is provided in order to register the user-defined variable classes 116 associated with the model. The Run method implements the simulation by calling an appropriate sequence of methods including the Begin method, the Load method, the New method, the Burn method, the Loop method, and/or the End method. Flags and arguments to the methods called by the Run function are set by the properties of the model class discussed above. The Run method may also accept a RunId or other suitable parameter that may be used to initialize functions and indentify the simulation being run.

The Begin method initializes the simulation and may cause the OnBegin function of the model and the OnBegin function of the variable classes 104 to be called. The Begin method may further pass the RunId parameter of the Run method to the each individual OnBegin function.

The New method is used to create, in the designated directory, the files necessary to store the results and information of the simulation, and the Load method reads the chain and the MCMC last status information from the designated directory and restarts the simulation from the last saved step.

The model class 102 also includes methods for running the simulation. In any MCMC simulation there is always an uncertainty about how long it takes before the chain reaches ergodic equilibrium. That is, there is always an uncertainty as to whether the simulation (by some measure) is sufficiently close to its limiting distribution. In this regard, the model class may include a Burn method as well as a Loop method. For example, a Burn method may be used to perform the MCMC simulation without saving the chain. It is noted that samples drawn during "burn-in" steps are not considered valid because the chain is not supposed to have reached the ergodic equilibrium yet. The number of burn-in steps is dependent upon the nature of the sampling equations, which affects how efficiently the distribution is sampled.

Once a suitable number of burn-in steps have been run, an MCMC Loop method may be executed to run the simulation. The Burn and Loop methods implement the MCMC simulations by executing a sampler, examples of which were discussed above with reference to FIGS. 1 and 2, by calling the user-defined Jump and Acceptance functions implemented in the registered user-defined variable classes 116. The Loop method also saves the chain and/or descriptive statistics of the simulation according to the parameters and settings discussed above. At the end of the simulation, if the user concludes that the chain has not converged sufficiently for the problem at hand, the user may then resume the chain for additional loops by using the Load method discussed above. Still further, since the user has full numerical control over the proposal and acceptance functions of each user-defined variable class 116, the user may opt to tweak one or more of the programmed sampling equations, e.g. by modifying the Jump and Acceptance functions in the associated user-defined variable class(es) 116, in which case the simulation should be restarted using the New method. The model class 102 also include an End method to inform the framework that the simulation has finished. Under this arrangement, the framework may also call the OnEnd functions of the model and variable classes.

The Callback function is called during execution of the simulation, e.g., during the execution of the Burn and Loop methods discussed below. The Callback function in the model class 102 is similar to the Callback function provided in the variable classes 104. For example, a user can override the Callback function to implement a model-specific monitoring function.

Like the variable classes 104, the model class 102 may include one or more events. For example, the OnBegin event may be used as an initialization routine that is invoked before the variable-specific OnBegin functions any time a simulation begins (Begin method above). Similarly, the OnEnd event may be used as a termination routine that is invoked after the variable specific OnEnd functions are called any time a simulation ends (see End method above). Such functions may be overridden by the user to implement user-specific initialization and termination code.

The MCMC Library—Model Implementation

Figure 12:
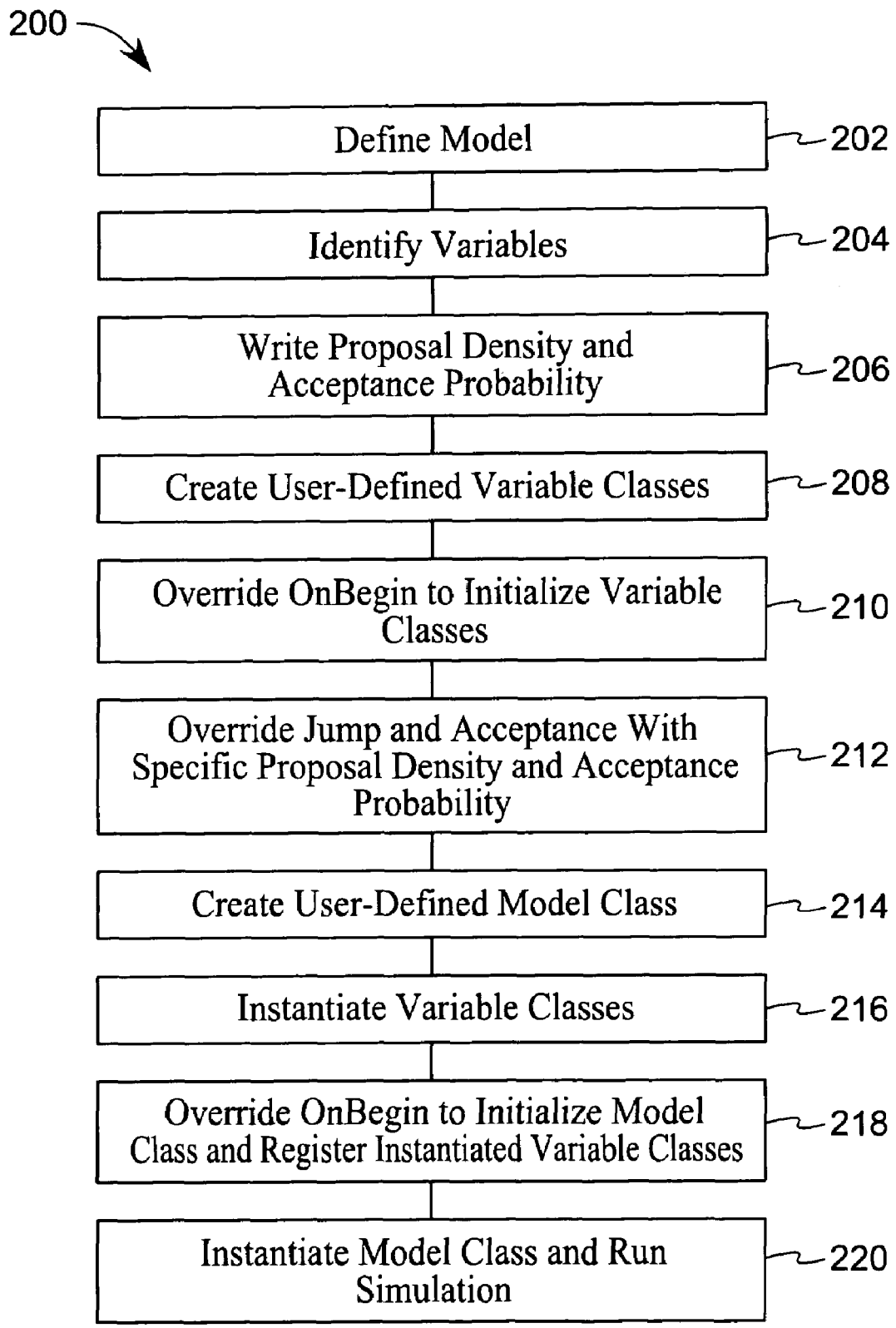
FIG. 12 is a flowchart illustrating a method of constructing an MCMC simulation.

The present invention allows for a standardization of the methods used for constructing an MCMC simulation using the MCMC library by inducing structure into the steps required to set up a simulation using MCMC techniques. Referring to FIG. 12, a method 200 for constructing an MCMC simulation comprises defining a model (the target distribution) at 202. The variables of interest are identified at 204. The user should opt to name the variables in the target distribution based on the differences in the functional form of their sampling equations to aid in the readability of the code, however any naming convention may be employed. The user writes the proposal density and acceptance probability for each variable according to the target distribution at 206. This step may be conceptual, or recorded in some fixed media, and will subsequently be used to encode the corresponding user-defined variable classes of the simulation as will be seen at step 212 described below.

A user-defined variable class is created for each variable in the model, deriving it from the most appropriate class, e.g., CMcmcVectorArray, CMcmcScalarArray, CMcmcVectorComponent, or CMcmcScalarComponent at 208. As noted above, a single class, the CMcmcVectorArray, is robust enough to accommodate virtually any variable type; however other variable types, such as those identified above, may provide certain operational efficiencies that may make such structures desirable, e.g., code readability and processing efficiency where there is no need to loop, such as for scalars. Each user-defined variable class is initialized at 210, for example by overriding the OnBegin event, and the Jump and Acceptance of each variable class are overridden at 212 with the corresponding proposal density and acceptance probability, which were constructed at 206. The user-defined model class is created at 214, and the user-defined variable classes are instantiated at 216. At 218 the user-defined model class is initialized and the user-defined variable classes are registered, for example by overriding the OnBegin event of the user-defined model class. The model class is instantiated and the simulation is run at 220.

Notably, in the example herein, the user-defined variable classes are instantiated at 216 as members of the user-defined model class. The variable classes generally need to access each other. If the variables classes are members of the user-defined model, they may access each other through the pointer of their container (the user-defined model) via the GetModel property discussed above. Alternatively, mutual access among variable classes may be realized by instantiating them globally.

Exemplary Application of Using the MCMC Library of the Present Invention

An example of implementing the method of FIG. 12 with the MCMC library discussed with reference to FIGS. 3-11, is illustrated in the hierarchical flowcharts of FIGS. 13A and 13B. Initially, with reference to FIG. 12, a target distribution is identified at 202 and the variables of interest are identified at 204. For example, consider a distribution P:

$$P = P(\vec{\alpha}, \vec{\beta}, \tau)$$

which is written as an explicit function of three variables $\vec{\alpha}$, $\vec{\beta}$ and $\tau$. In this example, the variables $\vec{\alpha}$ and $\vec{\beta}$ are assumed to be vectors and the variable $\tau$ is assumed to be a scalar.

The proposal density and acceptance probability is written for each of the variables of the distribution at 206. For the sake of the above example, let it be assumed that the full conditional probability may be calculated in a closed form for both the vector $\vec{\alpha}$ and the scalar $\tau$. Further, assume that a closed form for the full conditional probability for the vector $\vec{\beta}$, or its components, does not exist. Accordingly, for the variables $\vec{\alpha}$ and $\tau$, Gibbs sampling may be implemented. Therefore, the proposal density for the vector $\vec{\alpha}$, and the corresponding acceptance probability are written as:

$$J_\alpha = P(\vec{\alpha} \mid \vec{\beta}, \tau)$$

$$A_\alpha(\vec{\alpha}') = 1$$

where the primes indicates the proposal values.

Similarly, the proposal density and corresponding acceptance probability for the scalar variable $\tau$ may be written as:

$$J_\tau = P(\tau \mid \vec{\alpha}, \vec{\beta})$$

$$A_\tau(\tau') = 1$$

It was noted above that a closed form for the full conditional probability for the vector $\vec{\beta}$, or its components, does not exist. Thus a component wise Metropolis-Hasting algorithm with a normal random walk jump may be used. That is, the proposal density for the vector $\vec{\beta}$ may be given as:

$$J_{\beta_i} = N(\beta_i, \sigma_i)$$

Since the proposal density is symmetric, terms involving the proposal density cancel in the acceptance formula, which implies that the acceptance probability becomes:

$$A_{\beta_i}(\beta_i') = \frac{P(\vec{\alpha}, \beta_1, \ldots, \beta_i', \ldots, \beta_m, \tau)}{P(\vec{\alpha}, \vec{\beta}, \tau)}$$

The standard deviation $\sigma_i$ defines the scale of the proposal density for each component of the vector $\vec{\beta}$. One goal in the construction of the proposal density is to find a scale that gives the best convergence of the chain. These values are usually found empirically by subsequent attempts. A popular "rule of thumb" however, is to choose values that give an average acceptance close to 30%.

After defining the proposal density and the corresponding acceptance probability for the distribution that is to be sampled from, the user-defined variable classes are created at 208, the variable classes are initialized at 210, and the jump and acceptance are updated by the previously defined proposal density and acceptance probability at 212. The variable classes for the variables $\vec{\alpha}$, $\vec{\beta}$ and $\tau$ may be derived from the most appropriate variable class, e.g., CMcmcVectorArray, CMcmcScalarArray, CMcmcVectorComponent, or CMcmc-ScalarComponent as described above.

Keeping with the current example, all the components of the vector $\vec{\alpha}$ may be sampled at once, so $\vec{\alpha}$ is best represented by a single MCMC component of type vector, i.e., CMcmcVectorComponent variable class. An exemplary pseudocode may look like the following:

```
class CAlpha : public CMcmcVectorComponent
{
public:
    void OnBegin(int RunId); // Initialization
    void Jump(double * Value);
    double Acceptance(const double * Value);
};
```

Each component of the vector $\vec{\beta}$ is sampled separately, with a different jump and acceptance. However, suppose that the jump and acceptance of each component of $\vec{\beta}$ can be written as a function of the component index:

$$J_{\beta_i} = J_\beta(i)$$

$$A_{\beta_i}(\beta'_i) = A_\beta(\beta'_i, i)$$

where the functional forms $J_\beta$ and $A_\beta$ are the same for all of the components. The above assumption can almost always be made when dealing with components of the same vector. If this assumption does not hold, it may be better to choose different variable names for the vector components. Given the above equations, $\vec{\beta}$ is best represented by a MCMC array of scalars, e.g., CMcmcScalarArray, for example:

```
class CBeta : public CMcmcScalarArray
{
public:
    void OnBegin(int RunId); // Initialization
    void Jump(int Index, double & Value);
    double Acceptance(int Index, const double & Value);
};
```

As noted in the discussion above, the CMcmcVectorComponent and CMcmcScalarArray variable classes both define vectors. One difference between these variable classes is in the way they are each sampled. Where the variable class comprises a CMcmcVectorComponent class, all the components are updated at once. Where the variable class comprises a CMcmcScalarArray, the components are updated one at a time. The loop on the components is made by non-public methods in the class library.

A single MCMC component class of type scalar, e.g., CMcmcScalarComponent, for the variable $\tau$:

```
class CTau : public CMcmcScalarComponent
{
public:
    void OnBegin(int RunId); // Initialization
    void Jump(double & Value);
    double Acceptance(const double & Value);
};
```

For each user-defined CMcmcVariable class, e.g., corresponding to the variables $\vec{\alpha}$, $\vec{\beta}$ and $\tau$, a OnBegin is overridden to initialize the class, and the default Jump and Acceptance are updated with the corresponding proposal density and acceptance probability derived by the user.

```
CAlpha::OnBegin(int RunId)
{
    SetSize(N);
    SetName("Alpha");
    SetValue(0);
    Enable(MCMC_TRACK_CHAIN);
}
CBeta:: OnBegin(int RunId)
{
    SetSize(M);
    SetName("Beta");
    SetValue(0);
    Enable(MCMC_PRINT_SUCCESS |
        MCMC_TRACK_CHAIN);
}
CTau:: OnBegin(int RunId)
{
    SetName("Tau");
    SetValue(1);
    Enable(MCMC_TRACK_CHAIN);
}
```

The variable $\tau$ does not have the SetSize method, since it is a pure scalar. The MCMC_PRINT_SUCCESS flag in the CBeta class corresponding to the variable $\vec{\beta}$ is presented as an example to illustrate that prompts may be provided to give feedback to the user as to the status of the simulation. For example, screen prints may inform the user as to the average rate a new step has been accepted. Such feedback is useful when the Metropolis-Hasting algorithm is performed, to find the optimal jump. In the above example, there is no need to enable the MCMC_PRINT_SUCCESS flag for the CAlpha and CTau classes corresponding to the $\vec{\alpha}$ and $\tau$ variables, because in Gibbs sampling, the acceptance rate is always one.

The Jump and Acceptance methods must be overridden according to the mathematical model. The present invention allows the user to focus on this part of the simulation.

```
void CAlpha::Jump(double * New) { ... }
double CAlpha::Acceptance(cosnt double * New) { ... }
void CBeta::Jump(int Index, double & New) { ... }
double CBeta::Acceptance(int Index, const double & New) { ... }
void CTau::Jump(double & New) { ... }
double CTau::Acceptance(const double & New) { ... }
```

The MCMC library of the present invention is compatible with, and can be integrated with, any statistical library available to the user for providing the mathematical support for implementing the sampling equations. Thus the arbitrary values and draws from the various distributions may be derived from any software package or library available to the user.

The CMcmcModel class is created at 214, the above user-defined variable classes are instantiated at 216, registered with the model class at 218, and the simulation is run at 220. For example:

```
class CMyModel : public CMcmcModel
{
public:
    OnBegin(int RunId) // Initialization
    // Instances of the user-defined CMcmcVariable classes
```

-continued

```
    CAlpha m__Alpha;
    CBeta m__Beta;
    CTau m__Tau;
};
```

The variables are registered in the OnBegin through the Add method, for example:

```
CMyModel:: OnBegin(RunId)
{
    // Load data for the simulation, if any
    ...
    // Set path where to store the results
    SetPath(".\Results", MCMC__NEW);
    // Set diagnostic
    PrintEvery(100); // Set prompt frequency
    SaveEvery(100); // Set save frequency
    CallbackEvery(100); // Set callback frequency
    // Register variables
    Add(m__Alpha);
    Add(m__Beta);
    Add(m__Tau);
}
```

Figure 13A:
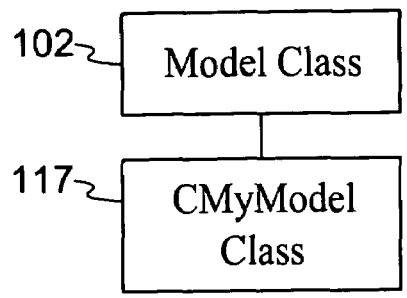
FIG. 13A is a chart illustrating the hierarchal relationship of the model classes for an exemplary MCMC simulation.
Figure 13B:
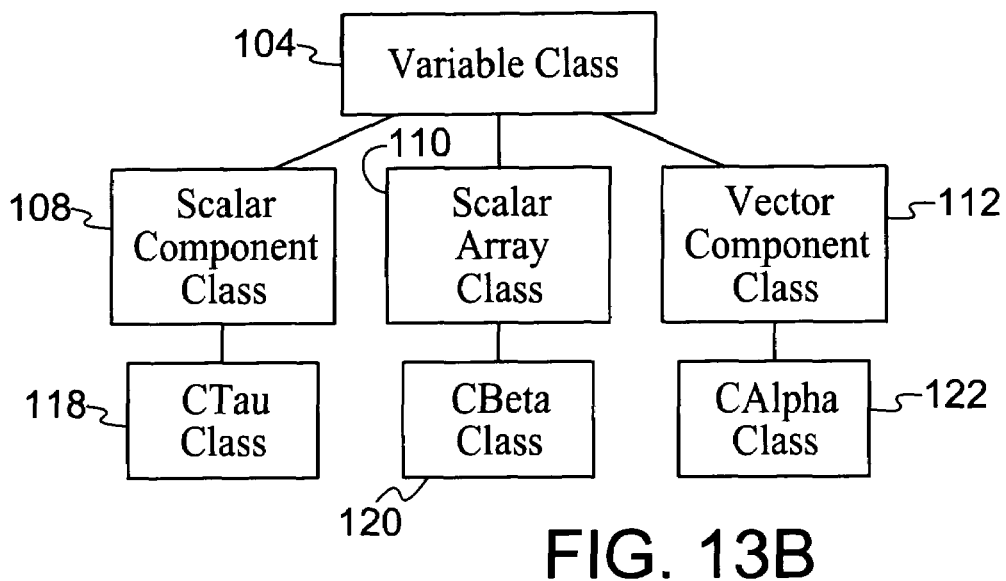
FIG. 13B is a chart illustrating the hierarchal relationships of the variable classes for an exemplary MCMC simulation.

Referring generally to FIG. 13A, the user-defined model class 117 is derived from the MCMC model class 102. With reference to FIG. 13B, the user-defined variable classes 118, 120, 122 are derived from the MCMC variable classes 104. It can be seen that the user-defined class CTau 118 is derived from the scalar component class 108, e.g., CMcmcScalarComponent. Similarly, CBeta 120 is derived from the scalar array class 110, e.g., CMcmcScalarArray class, and CAlpha 122 is derived from the vector component, e.g., CMcmcVectorComponent.

The model class is instantiated and the simulation is run.

```
void main( )
{
    CMyModel MyModel // Instance of the class CMyModel
    MyModel.Run( );
}
```

The present invention breaks down the target distribution of each variable of the simulation into a proposal density and corresponding acceptance probability, which are controllable by a user. The Jump function of each user-defined variable class defines the Monte Carlo technique to generate a sample. Essentially, a sample is drawn from the proposal distribution given the value of the current step of the chain. The proposal distribution is defined by overriding the Jump function for the associated variable class 104, and the acceptance probability is defined by overriding the Acceptance function for the associated variable class 104. When evaluating the sample, the framework generates a random number, typically between 0 and 1, and a decision is made whether to accept or reject the sample based upon the computed acceptance probability returned by the Acceptance function.

As noted above, the chain history is preferably stored in the statistics class pointed by each variable class. The statistics class need not be called, however, when computing the Jump and Acceptance, which reduces frequent cache swapping of the system as described more below.

Execution of MCMC Simulations

From a programming perspective, it can be seen that the MCMC library of the present invention provides only a few functionalities to remember, and the few functionalities that are needed have an easy and immediate interpretation. The MCMC core classes do not necessarily implement any numerical algorithms. However, the MCMC library implements the high level framework of any MCMC program, leaving to the user the task of filling in the numerical parts of the model, such as writing the mathematical form of the sampling equations, i.e., proposal density and acceptance probabilities for each variable of the target distribution, together with writing any initialization and termination code for each classes. Accordingly, the user can tweak the jump and acceptance methods to find equations that allow the chain to converge within the sample space. Moreover, the classes of the MCMC library are defined so as to induce a common structure on any MCMC program derived therefrom. The common structure of each MCMC simulation induced by the MCMC library discussed herein decreases the time required to implement an MCMC simulation and increases the readability and the robustness of the implementation itself.

While discussed in the above example with reference to a C++ object-oriented environment, the concepts herein are broadly applicable, e.g., the present invention may be implemented in any computer programming environment that emulates and/or implements for example, objects, object inheritance, and object reference.

Figure 14:
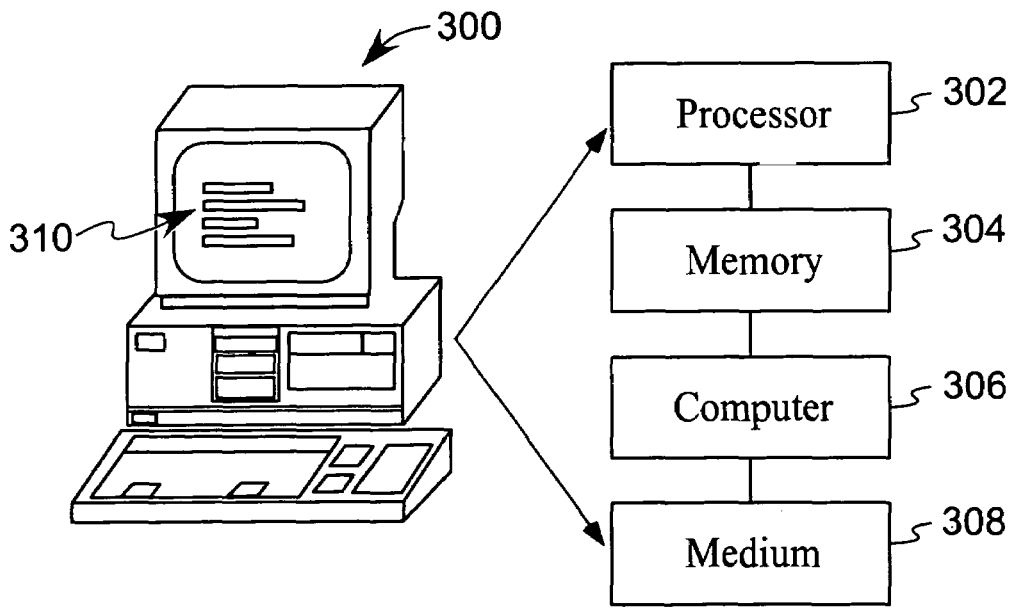
FIG. 14 is an illustration of a representative digital computer system that can be programmed according to the methods and structures of this invention.

Although the various embodiments of the present invention are discussed with respect to a library of classes for performing MCMC statistical simulation, it shall be appreciated that the present invention is not so limited. The present invention may be practiced on any form of computer system as schematically illustrated in FIG. 14. As shown, the computer 300, which may include a distributed network of computers 300, has at least one processor 302 and at least one memory device 304. The library of classes may be loaded into the memory device 304 using a computer readable medium 308. Thus, computer systems programmed with instructions embodying the library classes and methods disclosed herein, or computer systems programmed to perform MCMC simulation and storage or storing media that store computer readable instructions for converting a general purpose computer into a system simulator based upon the library classes and/or methods disclosed herein, are also considered to be within the scope of the present invention. Once a computer is programmed to implement the MCMC library, e.g., a simulation is written and compiled using compiler 306, and performs the particular functions of the library, including the methods of use as set out herein, such computer in effect, becomes a special purpose computer particular to the methods and program structures of this invention. The techniques necessary for this are well known to those skilled in the art of computer systems.

The methods and systems provided herein can be implemented and/or distributed on any computer readable medium 308 including volatile and nonvolatile memory, swappable intermediate storage mediums, which may include floppy drives, magnetic devices such as tape, cassette and disk based drives, hard drives, flash drives, compact disk (CD-ROM), digital video disk (DVD), and other information recording devices. Moreover, the computer readable medium includes a carrier wave or a carrier signal as may be transmitted by a computer server including internets, extranets, intranets, world wide web, ftp location, or other service that may broadcast, unicast or otherwise communicate, either over wire or wirelessly, an embodiment of the present invention. Moreover, the various embodiments of the present invention may be stored together or distributed, either spatially or temporally across one or more devices.

When the MCMC simulations are to be run, they will be loaded either from the distribution medium or their corresponding intermediate storage medium such as the computer readable medium 308 into the execution memory of the computer 300, configuring the computer 300 to act in accordance with the methods and program structures of the present invention. All of these techniques are will known to those skilled in the art of computer systems. Other computer system configurations can also be employed to perform the method of this invention, and to the extent that a particular system configuration is capable of performing the method of this invention, it is equivalent to the representative computer system and within the scope of this invention.

In addition, most of the code the user needs to write in generating an MCMC simulation using this library may be constructed using an optional dialog-based "wizard" interface 310 or otherwise executable application, which is schematically illustrated as being executed and displayed on the computer 300. The wizard interface 310 asks the user general questions about the model, such as the number, type, name, dimension, and initial values of the variables, automatically generates the code and leaves the user only with the task of filling in the Jump and Acceptance functions together with any customized code to read the data, monitoring the simulation, and reporting the results.

Memory Management and Optimizations

In the Jump and Acceptance methods defined herein for the variable classes 104, the variable classes are used as simple numeric variables and are likely accessed a very large number of times inside the loops and the mathematical functions defining the model. In order to prevent cache swapping every time an element of a variable class 104 is accessed, the variable classes 104 may preferably be constructed in a "lightweight" manner, e.g., the variable classes 104 only store the minimal information about their size, the pointer to their current chain value, the pointer to the corresponding model class 102, e.g., the CMcmcModel container, and the pointer to the statistics class 106, e.g., CMcmcStatistics class as described more fully herein. In this way, the statistics class 106 defines the memory of the variable classes 104.

Figure 15:
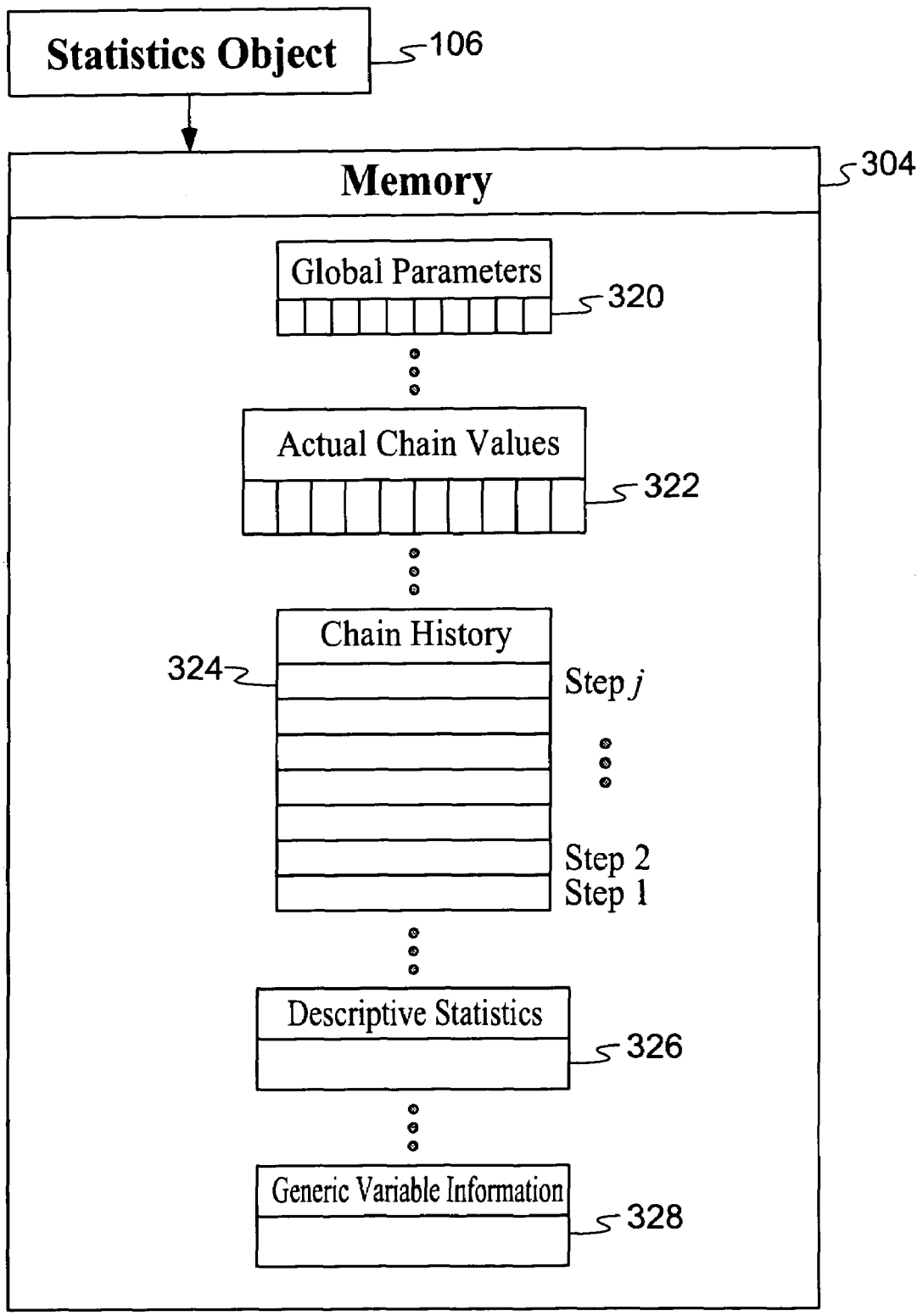
FIG. 15 is a schematic diagram illustrating exemplary logical groupings of simulation data in memory.

With reference to FIG. 15, a schematic diagram illustrates one exemplary manner in which the statistics class 106 can define the memory of a simulation, including the variable classes 104. As illustrated, the statistics class 106 organizes simulation data that is to be stored in memory, e.g., the memory 304 into at least five distinct logical groupings including a Global Parameters memory block 320, an Actual Chain Values memory block 322, a Chain History memory block 324, a Descriptive Statistics memory block 326 and a Generic Variable Information memory block 328. Each memory block 320, 322, 324, 326 and 328 need not be stored adjacent to one another. However, generally, the information stored in each individual memory block 320, 322, 324, 326 and 328 is stored sequentially in adjacent "segments" of memory, accordingly to the manner in which it is accessed. For example, only the current chain values are needed in calculating the Jump and Acceptance for a given variable class, so the current chain values are stored in adjacent segments of memory pointed by each variable class 104. The current value of the chain is used to update the chain history and the statistics at the end of each step. Chain history and descriptive statistics need not be accessed into the Jump and Acceptance functions, and therefore are stored in adjacent segments of memory different from the Actual Chain Values memory block.

The Global Parameters memory block 320 provides a contiguous set of segments for storing simulation global parameters such as the thinning interval, i.e., how often the chain should be sampled, the number of burn-in steps, the number of actual MCMC simulation steps, the frequency that the diagnostics should be printed, the frequency at which the chain, statistics and MCMC status should be saved, simulation flags and other global type variables. The Global Parameter memory has a very small size and can be load into the cache without affecting its capacity.

The Actual Chain Values memory block 322 provides a contiguous block of segments associated with each user-defined variable class 116, for storing actual values of the chain. The variable classes directly point to their associated contiguous segments of the Chain Values memory block 322 during the MCMC simulation. For example, as noted in greater detail with reference to FIG. 6, each variable class includes operators, such as element extraction and type cast that may be overloaded. For example, if x is a variable class of type CMcmcVectorArray, x[i] may be set up to return the pointer to the $i^{th}$ vector of the array. Similarly, x[i][j] may be set up to return the $j^{th}$ element of the $i^{th}$ vector of the array. The Actual Chain Values memory block is the most-often accessed block. It repeatedly accessed within the calculation of Jump and Acceptance for each component of the chain at each step.

The Chain History memory block 324 may be implemented as a stack that is grown at the end of each step with the current chain values. The stack may be written to file and flushed depending on the value passed to the SaveEvery property of the model class. The selection or exclusion of specific components of the chain in the Chain History memory block 324 may also optionally be set based upon predetermined tracking flags, e.g., set by the Enable and Disable methods which selectively enables or disables the diagnostic and tracking flags respectively for given components of the variable classes.

The Descriptive Statistics memory block 326 may be used to save statistical information about each component of the distribution, e.g., max, min, mean, average, etc. The Descriptive Statistics memory block 326 is updated at the end of each step based upon the current chain value. The Generic Variable Information memory block 328 may be used to store variable specific information. The Generic Variable Information memory block 328 is typically never used during execution of the MCMC burn-in and loop functions.

While only exemplary, the organization of simulation data into the memory block 320, 322, 324, 326 and 328 improves the performance of the simulation, especially for models with a big number of variables, by allowing an efficient used of the cache of the computer processor, e.g., by placing anticipated sequentially accessed data in adjacent or at least proximate segments of the memory 304.

Having described the invention in detail and by reference to preferred embodiments thereof, it will be apparent that modifications and variations are possible without departing from the scope of the invention defined in the appended claims.

What is claimed is:

1. A computer program product for performing Markov chain Monte Carlo simulations using a library of classes, comprising:
   a computer usable storage medium having computer usable program code embodied therewith, which when executed on a computer, causes the computer to run said Markov chain Monte Carlo simulations, the computer usable program code comprising:
    computer usable program code configured to define a variable class that supports derived user-defined variable classes assignable to each variable of a target distribution to be sampled from, said variable class comprising:
        computer usable program code configured to provide a jump function to be overridden with a user-defined proposal density function in a corresponding user-defined variable class; and
        computer usable program code configured to implement an acceptance function to be overridden with a user-defined acceptance probability function in said corresponding user-defined variable class;
    computer usable program code configured to implement a model class that defines a container for instances of said user-defined variable classes, said model class including:
        computer usable program code configured to implement at least one sampler function that is executed to perform a Markov chain Monte Carlo simulation by calling said user-defined proposal density and user-defined acceptance probability functions for said instances of user-defined variable classes contained in said model class;
    computer usable program code configured to generate simulation results based upon execution of the Markov chain Monte Carlo simulation; and
    computer usable program code configured to convey the simulation results to the user.

2. The computer program product according to claim 1, wherein said computer usable program code configured to implement a variable class supports a derived variable class that defines an array of vectors.

3. The computer program product according to claim 1, wherein said computer usable program code configured to implement a variable class supports:
    computer usable program code configured to define a first derived variable class that defines an array of vectors;
    computer usable program code configured to define a second derived variable class that defines an array of scalars;
    computer usable program code configured to define a third derived variable class that defines a single vector; and
    computer usable program code configured to define a fourth derived variable class that defines a single scalar.

4. The computer program product according to claim 1, wherein said variable class further comprises a pointer to a current value of a chain that is created in execution of said simulation.

5. The computer program product according to claim 1, wherein said variable class further comprises a pointer to a structure containing statistics of said simulation that is utilized to report said statistics of said simulation to said user.

6. The computer program product according to claim 1, wherein both said variable class and said model class support events that may be overridden to implement user-defined run-time functions for monitoring said simulation.

7. The computer program product according to claim 1, wherein said model class supports functions to run a plurality of variations of said simulation, including an ability to restart said simulation from a previously saved point.

8. A method of performing a Markov chain Monte Carlo simulation on a computer using a library of classes comprising:
    identifying a distribution to sample from;
    creating a user-defined variable class deriving it from a variable class of said library of classes for each variable of said distribution including:
        defining a proposal density according to said distribution to sample from;
        encoding into said user-defined variable class, a user-defined jump function implementing said proposal density;
        defining an acceptance probability according to said distribution to sample from; and
        encoding into said user-defined variable class, a user-defined acceptance function implementing said acceptance probability;
    instantiating each of said user-defined variable class;
    registering each instance of said user-defined variable classes in a model class;
    instantiating said model class;
    running said simulation by executing a sampler function which calls said user-defined jump function and user-defined acceptance function for each instance of user-defined variable class registered in said instance of said model class;
    generating simulation results based upon running said simulation; and
    conveying said simulation results to the user.

9. The method of performing a Markov chain Monte Carlo simulation on a computer using a library of classes according to claim 8, further comprising initializing said simulation by setting a thinning interval, a number of burn-in steps, and a number of MCMC steps.

10. The method of performing a Markov chain Monte Carlo simulation on a computer using a library of classes according to claim 8, further comprising at least one of writing a constructor and overriding an initialization routine to initialize each user-defined variable class.

11. The method of performing a Markov chain Monte Carlo simulation on a computer using a library of classes according to claim 8, wherein said simulation is run by executing a sampler function, wherein said sampler function comprises for each variable class:
    performing a draw from said proposal density encoded into said user-defined variable class; and
    accepting said draw into a chain based upon said acceptance probability encoded into said user-defined variable class.

12. The method of performing a Markov chain Monte Carlo simulation on a computer using a library of classes according to claim 11, wherein said simulation is run by first executing a said sampler function from said model class without saving said draws otherwise accepted into said chain for a predetermined number of steps, then executing said sampler function and saving said draws accepted into said chain.

13. The method of performing a Markov chain Monte Carlo simulation on a computer using a library of classes according to claim 8, further comprising saving to file the statistics of said simulation, such that said simulation may be stopped and resumed.

14. The method of performing a Markov chain Monte Carlo simulation on a computer using a library of classes according to claim 8, further comprising storing chain history information in a stack that is grown at the end of each step of said simulation with the current chain values.

15. A system for performing Markov chain Monte Carlo Simulation using a library of classes on a computer comprising:

a processor;

a memory device;

program code resident in said memory device, said program code executable by said processor to run said Markov chain Monte Carlo simulation comprising;

creating a user-defined variable class deriving it from a variable class of said library of classes for each variable of said distribution including:

encoding into said user-defined variable class, a user-defined jump function implementing a proposal density;

encoding into said user-defined variable class, a user-defined acceptance function implementing an acceptance probability;

instantiating each of said user-defined variable class;

registering each instance of said user-defined variable classes in a model class;

instantiating said model class;

running said simulation by executing a sampler function which calls said user-defined jump function and user-defined acceptance function for each instance of said user-defined variable class registered in said instance of said model class;

generating simulation results based upon running said simulation; and conveying said simulation results to the user.

16. The system for performing Markov chain Monte Carlo Simulation on a computer according to claim 15, wherein said sampler function performs for each user-defined variable class, a draw from said distribution based upon drawing from said proposal density encoded into said user-defined variable class and accepting said proposed draw into a chain based upon said acceptance probability encoded into said user-defined variable class.

17. The system for performing Markov chain Monte Carlo Simulation on a computer according to claim 15, further comprising providing code for storing statistics relative to the said simulation.

18. The system for performing Markov chain Monte Carlo Simulation on a computer according to claim 17, wherein said user-defined variable class further comprises a pointer to a current value of a chain created in execution of said simulation.

19. The system for performing Markov chain Monte Carlo Simulation on a computer according to claim 17, further storing data to said memory device in blocks of sequential segments according to the manner said data is likely accessed during the simulation.

20. The system for performing Markov chain Monte Carlo Simulation on a computer according to claim 15, wherein said program code comprises object-oriented, C++ code.

* * * * *

UNITED STATES PATENT AND TRADEMARK OFFICE
CERTIFICATE OF CORRECTION

PATENT NO.        : 7,409,325 B2
APPLICATION NO.   : 11/190595
DATED             : August 5, 2008
INVENTOR(S)       : Michele Morara It is certified that error appears in the above-identified patent and that said Letters Patent is hereby corrected as shown below:

Col. 5, line 42, components, $x_o(x_{o,1}, \ldots, x_{o,m})$.

should read components, $x_o = (x_{o,1},\ldots,x_{o,m})$.

Signed and Sealed this

Twenty-eighth Day of October, 2008

JON W. DUDAS
*Director of the United States Patent and Trademark Office*